US 9,945,652 B2

(12) United States Patent
Mian et al.

(10) Patent No.: US 9,945,652 B2
(45) Date of Patent: Apr. 17, 2018

(54) BRAKE COMPONENT MONITORING

(71) Applicant: International Electronic Machines Corporation, Troy, NY (US)

(72) Inventors: Zahid F. Mian, Loudonville, NY (US); Nicholas P. Glasser, Troy, NY (US); Ronald W. Gamache, East Greenbush, NY (US)

(73) Assignee: International Electronic Machines Corporation, Troy, NY (US)

( * ) Notice: Subject to any disclaimer, the term of this patent is extended or adjusted under 35 U.S.C. 154(b) by 301 days.

(21) Appl. No.: 13/573,686

(22) Filed: Oct. 3, 2012

(65) Prior Publication Data

US 2013/0083188 A1 Apr. 4, 2013

Related U.S. Application Data

(60) Provisional application No. 61/626,765, filed on Oct. 3, 2011.

(51) Int. Cl.
*G01B 5/00* (2006.01)
*B60T 17/22* (2006.01)
*G01B 11/06* (2006.01)

(52) U.S. Cl.
CPC .......... *G01B 5/0028* (2013.01); *B60T 17/228* (2013.01); *G01B 11/06* (2013.01); *B60T 2270/406* (2013.01)

(58) Field of Classification Search
CPC ..... B60T 17/228; G01B 11/06; G01B 5/0028; B61H 11/00

(Continued)

(56) References Cited

U.S. PATENT DOCUMENTS 5,180,122 A * 1/1993 Christian ................ B64F 5/20
244/134 C
5,327,782 A * 7/1994 Sato ..................... B60T 17/22
340/454

(Continued)

FOREIGN PATENT DOCUMENTS

CN 101246090 A 8/2008
DE 102007058993 A1 6/2009
(Continued)

OTHER PUBLICATIONS

Paek, International Search Report and Written Opinion for International Application No. PCT/US2012/000447, dated Jan. 2, 2013, 9 pages.

(Continued)

*Primary Examiner* — Mohammed Rahaman
*Assistant Examiner* — Jimmy S Lee
(74) *Attorney, Agent, or Firm* — LaBatt, LLC

(57) ABSTRACT

A solution for evaluating a component of a vehicle, such as a brake pad of a rail vehicle, is provided. An imaging component can acquire image data for a target area of the vehicle within which at least a portion of the component is visible. The target area can be illuminated by an illumination device that is, for example, horizontally offset from the imaging device to highlight the three-dimensional structure in the target area by creating shadows in the image data. A set of points corresponding to the component can be identified in the image data using the shadows. A measurement for at least one attribute of the component can be calculated from the set of points.

20 Claims, 9 Drawing Sheets

(58) Field of Classification Search
USPC .......................................................... 348/135
See application file for complete search history.

(56) References Cited

U.S. PATENT DOCUMENTS

| | | | |
|---|---|---|---|
| 6,768,551 | B2 | 7/2004 | Mian et al. |
| 7,564,569 | B2 | 7/2009 | Mian et al. |
| 8,006,559 | B2 | 8/2011 | Mian et al. |
| 2007/0064244 | A1* | 3/2007 | Mian ....................... G01B 11/25 356/601 |
| 2009/0018721 | A1 | 1/2009 | Mian et al. |
| 2009/0040503 | A1* | 2/2009 | Kilian ................. B61L 27/0094 356/23 |
| 2009/0049936 | A1* | 2/2009 | Mian ..................... G01M 17/10 73/865.8 |
| 2009/0055041 | A1 | 2/2009 | Mian et al. |
| 2010/0025170 | A1 | 2/2010 | Centeno et al. |
| 2010/0100275 | A1 | 4/2010 | Mian et al. |
| 2010/0220173 | A1* | 9/2010 | Anguelov .......... H04N 5/23238 348/36 |
| 2011/0006920 | A1* | 1/2011 | Bauer ....................... B64F 1/20 340/972 |
| 2011/0024576 | A1 | 2/2011 | Kilian et al. |
| 2012/0262572 | A1* | 10/2012 | Cudak ................ H04N 13/0007 348/135 |

FOREIGN PATENT DOCUMENTS

| | | |
|---|---|---|
| EP | 2067685 | 6/2009 |
| JP | 06123608 | 5/1994 |
| JP | 2001227924 A | 8/2001 |
| JP | 3615980 | 2/2005 |
| WO | 2008089836 A1 | 7/2008 |

OTHER PUBLICATIONS

Application No. 2015252088, Examination Report 1, dated Sep. 8, 2016, 2 pages.
Application No. 2012319178, Examination Report 1, dated Apr. 2, 2015, 3 pages.
Application No. 201280048676.7, English Translation of Office Action 1, dated Nov. 3, 2015, 5 pages.

* cited by examiner

BRAKE COMPONENT MONITORING

REFERENCE TO RELATED APPLICATIONS

The current application claims the benefit of U.S. Provisional Application No. 61/626,765, titled "Brake Component Monitoring System and Method," which was filed on 3 Oct. 2011, and which is hereby incorporated by reference.

TECHNICAL FIELD

The disclosure relates generally to brakes of vehicles, and more particularly, to monitoring brake components of vehicles, such as rail vehicles.

BACKGROUND ART

Nearly half a million locomotives and freight cars form trains that transport a significant proportion of the United States' freight every year. These trains crisscross the country and can: measure over a mile in length; have a mass well over 20,000 tons; and move at speeds of fifty miles per hour or more. To slow and stop such trains requires brakes on each railcar. These brakes, similar to brakes on any other vehicle, will wear out and can malfunction in various ways. The failure of a brake can have many consequences, ranging from a damaged wheel to a derailment or a collision, which can result in many deaths.

FIG. 1 shows an illustrative rail car shoe brake according to the prior art. A railroad wheel 2 is generally a solid steel object with a number of component features, including a tread 3 on which the wheel 2, and therefore the rail vehicle, rests on a rail. A brake assembly 4 includes a brake pad 5 and a brake shoe 7, which are held together by a wave spring (key). The spring permits removal of the brake pad 5 whenever the brake pad 5 becomes too worn. The brake assembly 4 is attached to some device or mechanism, which can move the brake pad 5 into contact with the tread 3 of the wheel 2. This contact causes a dissipation of energy from the wheel 2 and thereby causes the train to slow.

However, the contact and friction also causes the brake pad 5 to wear. Eventually, the brake pad 5 will need to be replaced. However, the railroad industry does not have a well-established solution for routinely inspecting the condition of railcar brakes. To date, brake inspections are generally performed during incoming inspections, require the rail vehicle to be at a full stop, and merely involve an inspector examining the brakes "by eye." If the inspector has any doubt as to the condition of the brake pad 5, a metal ruler can be used to determine if the thickness remaining on the brake pad 5 is sufficient for its continued use.

SUMMARY OF THE INVENTION

Aspects of the invention provide a solution for evaluating a component of a vehicle, such as a brake pad of a rail vehicle. An imaging component can acquire image data for a target area of the vehicle within which at least a portion of the component is visible. The target area can be illuminated by an illumination device that is, for example, horizontally offset from the imaging device to highlight the three-dimensional structure in the target area by creating shadows in the image data. A set of points corresponding to the component can be identified in the image data using the shadows. A measurement for at least one attribute of the component can be calculated from the set of points.

A first aspect of the invention provides a system comprising: an imaging component including: a first imaging device configured to acquire image data for a target area of a vehicle; and a first illumination device configured to direct electromagnetic radiation on the target area, wherein the first illumination device is at least one of: horizontally or vertically offset from the first imaging device to create shadows in the image data; and a computer system for evaluating a component at least partially visible in the target area using the image data by performing a method comprising: locating a region of interest within the image data, wherein the region of interest corresponds to a location where the component is expected to be at least partially visible; identifying a set of points in the image data corresponding to at least two edges of the component, wherein the identifying includes identifying a separation point between the component and at least one other component using the shadows in the image data; and calculating a measurement for at least one attribute of the component using the set of points.

A second aspect of the invention provides a system comprising: an imaging component including: a first imaging device configured to acquire image data for a target area of a rail vehicle, wherein the target area includes at least a portion of a brake assembly of the rail vehicle; and a first illumination device configured to direct electromagnetic radiation on the target area, wherein the first illumination device is at least one of: horizontally or vertically offset from the first imaging device to create shadows in the image data; and a computer system for evaluating the brake assembly using the image data by performing a method comprising: locating a region of interest within the image data, wherein the region of interest corresponds to a location where the brake assembly is expected to be at least partially visible; identifying a set of points in the image data corresponding to at least two edges of the brake assembly, wherein the identifying includes identifying a separation point between the brake assembly and at least one other component using the shadows in the image data; and calculating a measurement for at least one attribute of the brake assembly using the set of points.

A third aspect of the invention provides a method comprising: evaluating a brake assembly using image data for a target area of a rail vehicle, wherein the target area includes at least a portion of a brake assembly of the rail vehicle and includes shadows caused by the brake assembly, the evaluating including: locating a region of interest within the image data, wherein the region of interest corresponds to a location where the brake assembly is expected to be at least partially visible; identifying a set of points in the image data corresponding to at least two edges of the brake assembly, wherein the identifying includes identifying a separation point between the brake assembly and at least one other component using the shadows in the image data; and calculating a measurement for at least one attribute of the brake assembly using the set of points.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated herein, inspections of brake components on rail vehicles are generally done by a human inspector, thereby requiring the rail vehicle to be at a full stop for the inspection. Such an inspection, when performed for every brake on every vehicle on a train, adds a substantial time delay and/or requires substantial manpower to perform. The inventors recognize that the rail industry could benefit from a solution for accurately and reliably examining rail vehicle brakes on a regular basis, which does not require the rail vehicle to come to a full stop. In this case, such a solution will not add a substantial amount of time for a train, or any rail vehicles included therein, to pass through a given location, unless a problem is identified that requires immediate resolution. Furthermore, by removing the human inspector, variations in the quality of the inspection due to human factors (e.g., boredom, distraction, inexperience, and/or the like), can be removed from the inspection process. The solution is described primarily with reference to rail car shoe brakes, which are commonly used on freight trains. However, it is understood that aspects of the invention can be directed to other types of brakes, which may be used on various types of trains, such as transit (passenger) trains.

Aspects of the invention provide a solution for evaluating a component of a vehicle, such as a brake pad of a rail vehicle. An imaging component can acquire image data for a target area of the vehicle within which at least a portion of the component is visible. The target area can be illuminated by an illumination device that is, for example, horizontally offset from the imaging device to highlight the three-dimensional structure in the target area by creating shadows in the image data. A set of points corresponding to the component can be identified in the image data using the shadows. A measurement for at least one attribute of the component can be calculated from the set of points. As used herein, unless otherwise noted, the term "set" means one or more (i.e., at least one) and the phrase "any solution" means any now known or later developed solution.

Figure 2:
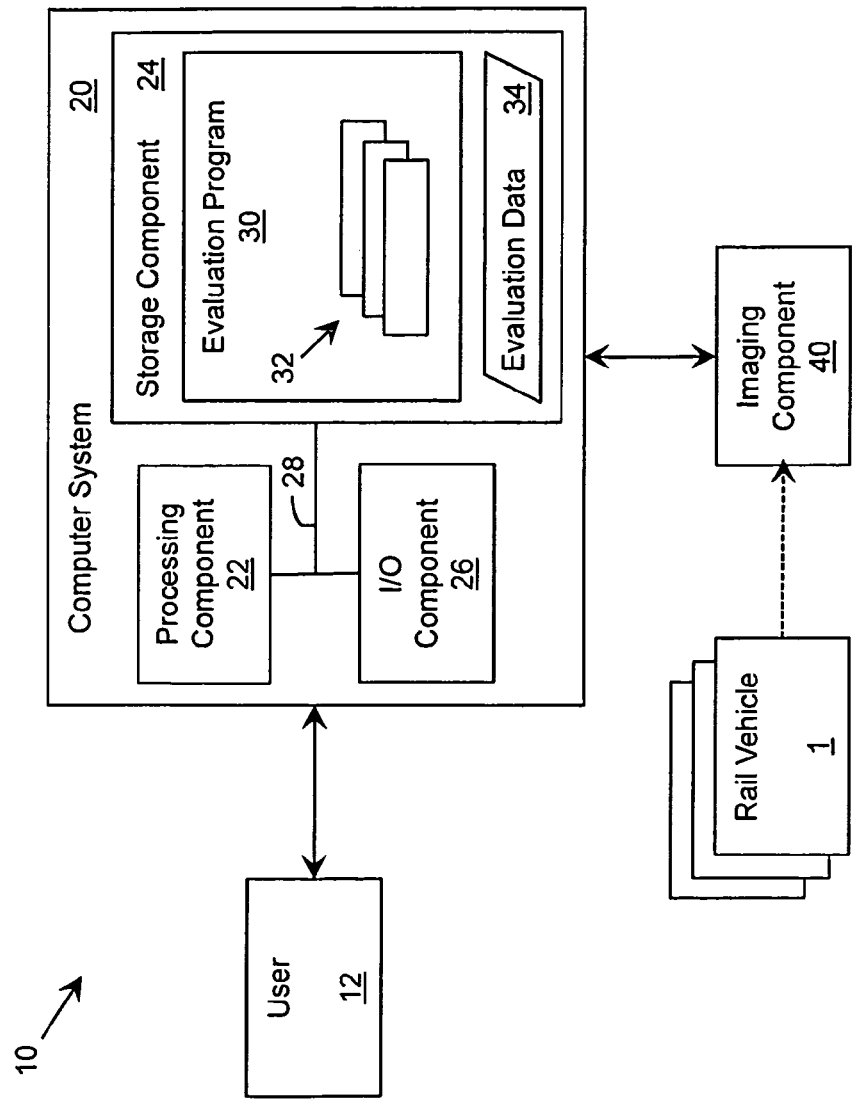
FIG. 2 shows an illustrative environment for evaluating a rail vehicle according to an embodiment.

Turning to the drawings, FIG. 2 shows an illustrative environment 10 for evaluating a rail vehicle 1 according to an embodiment. To this extent, the environment 10 includes a computer system 20 that can perform a process described herein in order to evaluate the rail vehicle 1. In particular, the computer system 20 is shown including an evaluation program 30, which makes the computer system 20 operable to evaluate the rail vehicle 1 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the evaluation program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 and/or an imaging component 40 to communicate with the computer system 20 using any type of communications link. To this extent, the evaluation program 30 can manage a set of interfaces (e.g., graphical user interface(s), application program interface, and/or the like) that enable the human and/or system users 12 and the imaging component 40 to interact with the evaluation program 30. Furthermore, the evaluation program 30 can manage (e.g., store, retrieve, create, manipulate, organize, present, etc.) the data, such as the evaluation data 34, using any solution.

In any event, the computer system 20 can comprise one or more general purpose computing articles of manufacture (e.g., computing devices) capable of executing program code, such as the evaluation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the evaluation program 30 can be embodied as any combination of system software and/or application software.

Furthermore, the evaluation program 30 can be implemented using a set of modules 32. In this case, a module 32 can enable the computer system 20 to perform a set of tasks used by the evaluation program 30, and can be separately developed and/or implemented apart from other portions of the evaluation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the evaluation program 30 fixed thereon (e.g., one or more modules 32). However, it is understood that the computer system 20 and the evaluation program 30 are only representative of various possible equivalent computer systems that may perform a process described herein. To this extent, in other embodiments, the functionality provided by the computer system 20 and the evaluation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems or devices, such as the imaging component 40, using any type of communications link. In either case, the communications link can comprise any combination of various types of optical fiber, wired, and/or wireless links; comprise any combination of one or more types of networks; and/or utilize any combination of various types of transmission techniques and protocols.

Figure 3:
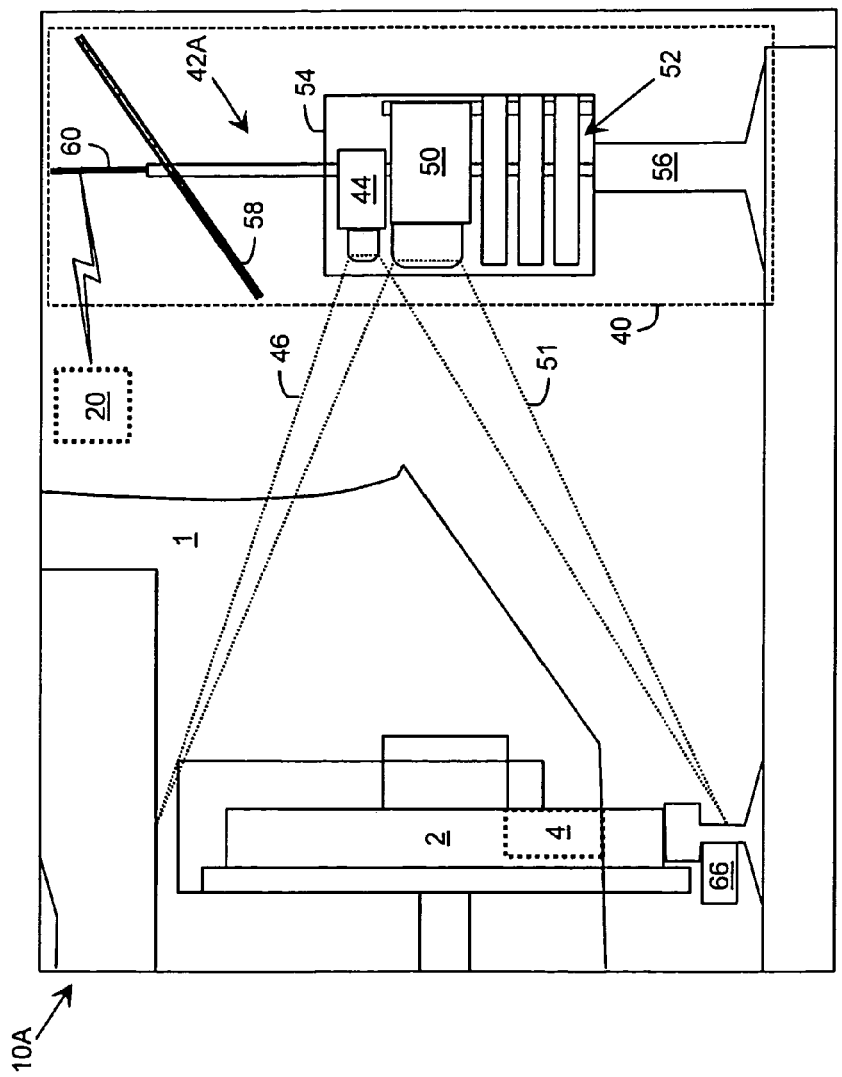
FIG. 3 shows an illustrative physical diagram of an environment according to an embodiment.

As discussed herein, the evaluation program 30 enables the computer system 20 to evaluate a rail vehicle 1 using image data acquired by the imaging component 40. For example, the environment 10 can be configured to locate rail vehicles 1 whose brakes are worn beyond safe limits or are otherwise malfunctioning and can initiate one or more actions in response to evaluation of such a condition as being present on a rail vehicle 1. To this extent, FIG. 3 shows an illustrative physical diagram of an environment 10A according to an embodiment. The environment 10A is shown including a sensor assembly 42A, which is configured to acquire image data as a rail vehicle 1 passes the location of the sensor assembly 42A (e.g., as part of a train, a consist, or the like). While a single sensor assembly 42A is shown included as part of the imaging component 40, it is understood that the imaging component 40 can include any number of sensor assemblies 42A. For example, an embodiment of the imaging component 40 can include at least two sensor assemblies 42A, one for acquiring image data for each side of the rail vehicle 1.

In any event, the sensor assembly 42A can include at least one imaging device 44, which is configured to acquire image data having a field of view 46 corresponding to each rail wheel 2 of each rail vehicle 1 as it passes the sensor assembly 42A. The imaging device(s) 44 can acquire image data based on any type of electromagnetic radiation and using any solution. In an embodiment, the imaging device 44 acquires image data based on visible light. However, the imaging component 40 can include one or more imaging devices 44 sensitive to any combination of visible, infrared, and/or other wavebands. Additionally, each imaging device 44 can use a two dimensional imaging array, such as a standard charge coupled device (CCD) camera, to capture the image data. However, it is understood that an imaging device 44 can use any alternative imaging solution, such as a line scan camera which generates a two dimensional image of a passing rail vehicle by performing successive linear scans of the rail vehicle 1 as it passes the sensor assembly 42A. Furthermore, the imaging device 44 can be configured to acquire image data having any target resolution, exposure time, and/or frame rate. In an embodiment, the imaging device 44 generates image data having a resolution that provides sufficient clarity and detail for the analyses described herein while the rail vehicle 1 is traveling at speeds up to seventy miles per hour or more. Regardless, the imaging device 44 can be mounted at an angle and distance with respect to the path of travel for the rail wheel 2, which enables the imaging device 44 to acquire clear images of the brake assembly 4 located adjacent to the rail wheel 2.

Figure 4:
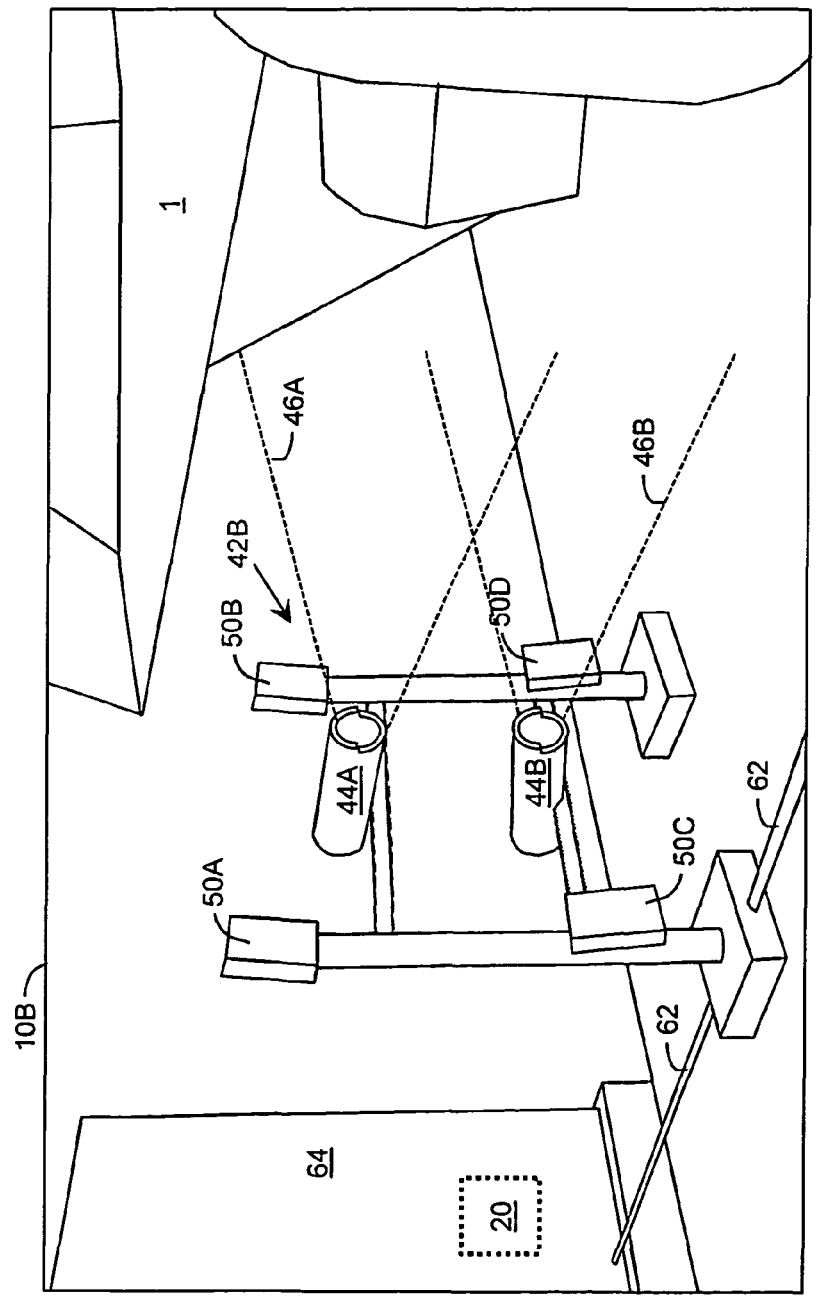
FIG. 4 shows an illustrative physical diagram of an environment according to another embodiment.

In an embodiment, a sensor assembly 42A of the imaging component 40 includes at least two imaging devices 44. For example, FIG. 4 shows an illustrative physical diagram of an environment 10B according to another embodiment. In this case, the sensor assembly 42B includes a pair of imaging devices 44A, 44B. The imaging device 44A is located higher than a location of a brake assembly 4 (FIG. 3) on the rail wheel 2 (FIG. 3), and is positioned with a slight downward angle to acquire image data corresponding to a top visible portion of the brake assembly 4. Furthermore, the imaging device 44B is located lower than a location of the brake assembly 4 on the rail wheel 2, and is positioned with a slight upward angle to acquire image data corresponding to a bottom visible portion of the brake assembly 4. As illustrated, the imaging devices 44A, 44B can have fields of view 46A, 46B, respectively, which overlap in a region of interest. The locations and angles of the imaging devices 44A, 44B can be configured based on typical attributes of a rail vehicle 1 and rail wheel 2 and the location of the sensor assembly 42B relative to the path of travel of the rail wheels 2 using any solution. However, it is understood that when multiple imaging devices 44A, 44B are implemented, each imaging device 44A, 44B can be distinct from one another. For example, a sensor assembly 42B can include a visible light imaging device and an infrared imaging device, two or more visible light imaging devices that acquire image data in distinct manners, and/or the like.

Returning to FIG. 3, the sensor assembly 42A also can include one or more illumination devices 50. The illumination device(s) 50 can be configured to project electromagnetic radiation (e.g., visible light) in an area of coverage 51, which corresponds to the field of view 46 of the imaging device(s) 44. In particular, the area of coverage 51 can at least include a region of the field of view 46, within which the brake assembly 4 is anticipated to be viewable and imaged by the imaging device 44. An illumination device 50 can be configured to project any type of diffuse, focused, strobed, coherent (e.g., laser), and/or the like, electromagnetic radiation. In an embodiment, the illumination device 50 is a high-intensity halogen light. Regardless, it is understood that in certain environments 10A and/or with certain imaging devices 44, the imaging component 40 can be implemented without any illumination device 50.

Similar to the imaging device(s) 44, the illumination device 50 also can be mounted at an angle with respect to the target imaging area. For example, returning to FIG. 4, the sensor assembly 42B is shown including four illumination devices 50A-50D. In this case, two illumination devices 50A, 50B are located above the target image area and are angled slightly downward, while two illumination devices 50C, 50D are located below the target image area and are angled slightly upward. Furthermore, each illumination device 50A-50D can be angled slightly inward toward the corresponding imaging devices 44A, 44B. Regardless, the illumination devices 50A-50D can be, for example, flat panel light emitting diode (LED) illuminators, each of which can emit light from a wide area, thereby covering many possible variations in the construction of the rail vehicle assembly. However, it is understood that any illumination solution, which provides sufficient light in the target area can be utilized. Furthermore, when multiple illumination devices 50A-50D are present, multiple types of illumination devices 50A-50D can be utilized (e.g., diffuse light, diffuse infrared, patterned light, and/or the like).

The sensor assemblies 42A, 42B shown in FIGS. 3 and 4 can include a set of processing components. For example, the sensor assembly 42A also includes a set of supporting components 52, which can include one or more electronic and computing components. The supporting components 52 can include components necessary to control the acquisition and transfer of the images by the imaging component 40. Furthermore, the supporting components 52 can include components capable of performing analysis of the image data acquired by the imaging device(s) 44. For example, the supporting components 52 can determine a state of the brakes, trigger action events, and/or the like. While shown as separate components 52 in the sensor assembly 42A, it is understood that the processing capability of the supporting components 52 can be incorporated into one or more other components, such as the imaging devices 44A, 44B of the sensor assembly 42B.

Depending on the deployment location, the ambient lighting conditions can vary widely for different inspections. To this extent, in an embodiment, the supporting components 52 also can include one or more ambient lighting sensors, and the illumination devices 50A-50D can be configured to provide adjustable lighting. In this case, the computer system 20 and/or a supporting component 52 can be configured to adjust one or more aspects of the light provided by the illumination devices 50A-50D based on the ambient lighting using any solution. Furthermore, the illumination devices 50A-50D and imaging devices 44A, 44B can be configured to operate in bright daylight, at night, in rain fog, snow, and/or the like. When processing the image data, the computer system 20 can be configured to compensate for anomalies, such as brightness, glare, reflections, and/or the like and/or reject image data that includes too much anomalous data.

Furthermore, the sensor assemblies 42A, 42B can include various other components. For example, the sensor assembly 42A is shown including a protective weatherproof enclosure 54, which encloses and supports the various electronic components 44, 50, 52, and which is itself supported by a support structure 56 at a desired height relative to the brake assembly 4. In this case, the weatherproof enclosure 54 can include sliding or otherwise opening shutters, which can be normally closed and open only when the imaging device 44 is active. Alternatively, the electronic components of a sensor assembly, such as the electronic components 44A-44B, 50A-50D of the sensor assembly 42B, can comprise rugged enclosures, which do not require an additional weatherproof enclosure.

In an embodiment, a sensor assembly 42A, 42B can include one or more features which enable the sensor assembly 42A, 42B to be portable and/or more readily installed. For example, a sensor assembly 42A, 42B can be configure to be deployed to a location, which lacks a ready power source. To this extent, a sensor assembly can include an on-site power source. The sensor assembly 42A is shown including a solar panel 58, which can be configured to provide power for the various electronic components 44, 50, 52 and/or recharge a battery, or the like, which is located at the sensor assembly 42A and provides power to the various electronic components 44, 50, 52. Similarly, a sensor assembly can be deployed to a location that cannot be readily wired for data transmission. In this case, the sensor assembly 42A can include a wireless transmission link 60 for communicating with the computer system 20.

However, it is understood that these features are not required. For example, the sensor assembly 42B is shown including a wired connection 62, which can provide both power and data communications for the electronic components 44A-44B, 50A-50D located on the sensor assembly 42B and a local computer system 20, which can be located in a nearby shelter 64 (e.g., a shed). When installed permanently and/or in a portable application, it is understood that the installation can include careful and accurate measurement of the trackside to sensor assembly 42A, 42B distance to ensure that the imaging can be properly performed, the sensor assembly 42A, 42B is not likely to be damaged by loose/hanging debris, and/or the like.

Regardless, the various electronic components on the sensor assemblies 42A, 42B can be powered off or placed into a standby mode when no rail vehicles 1 are passing. To this extent, the environments 10A, 10B also can include one or more sensors, such as a wheel sensor 66 attached to the rail. The wheel sensor 66 can generate a signal in response to a presence of a rail vehicle 1 (e.g., a rail wheel 2) that activates the various electronic components on the corresponding sensor assembly 42A, 42B in sufficient time to acquire the image data described herein. In an embodiment, the wheel sensor 66 can communicate directly with a component, such as a supporting component 52, which activates the imaging device(s) 44 and/or illumination device(s) 50. Alternatively, the wheel sensor 66 can communicate with the computer system 20, which activates all of the electronic components 44, 50, 52.

As described herein, the locations (e.g., height and distance) and angles of the imaging device(s) 44 and/or the illumination device(s) 50 can be configured to provide a sufficient (e.g., substantially optimal) view/illumination of the respective portions of the brake assembly 4 to enable the imaging device(s) 44 to acquire image data capable of being utilized in evaluating the brake assembly 4 as described herein.

Figure 5:
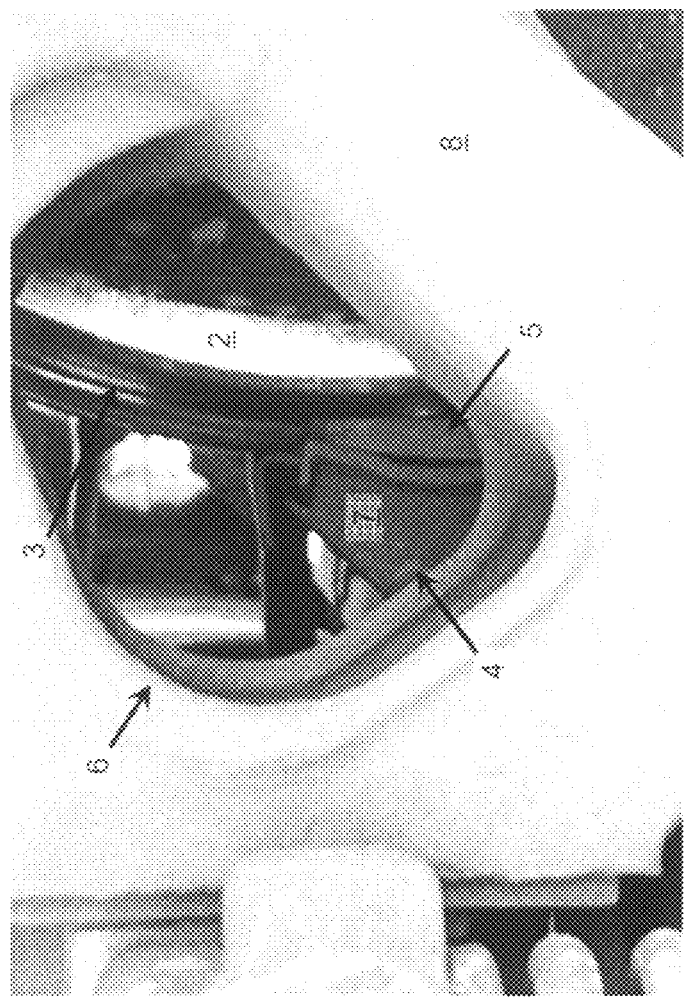
FIG. 5 shows an illustrative image of a brake assembly according to an embodiment.

For example, FIG. 5 shows an illustrative image 48 of a brake assembly 4, which can be acquired by an imaging device 44, such as the imaging device 44A (FIG. 4), located at an angle with respect to the brake assembly 4, according to an embodiment. As illustrated, the image 48 can include image data of a portion of the brake assembly 4, including the brake pad 5 and the brake shoe 7, which is visible through an opening 6 in a truck assembly 8 of the rail vehicle 1 (FIG. 3). The truck assembly 8 is the portion of the rail vehicle 1 on which the wheels 2 ride, and is an important aspect of the design of railroad vehicles 1. However, the presence of the truck assembly 8 presents a challenge when using a machine vision-based solution for evaluating the brake assembly 4.

Figure 6:
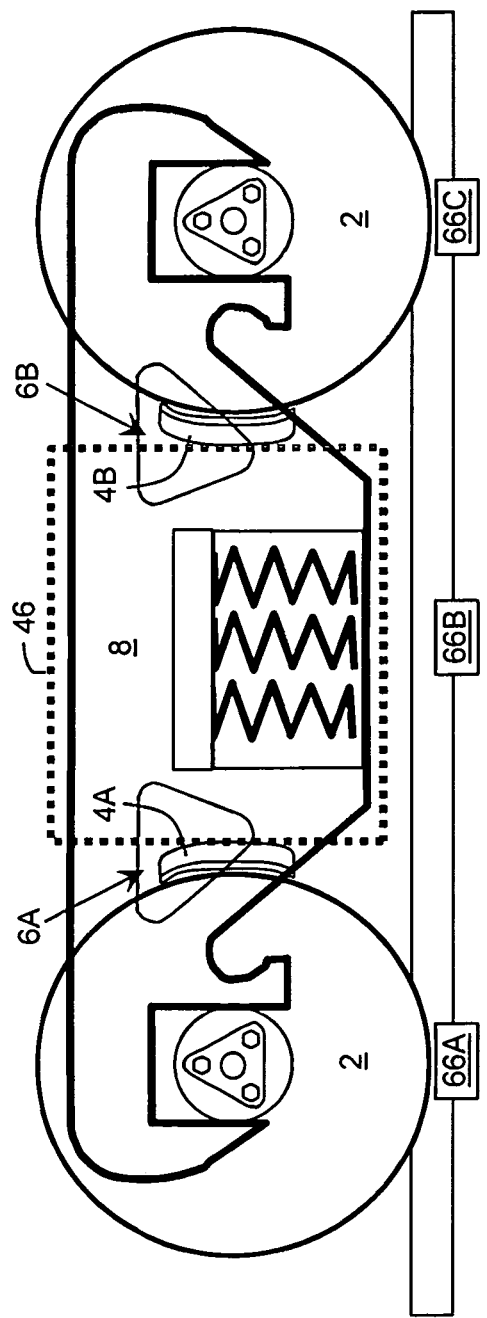
FIG. 6 shows an illustrative physical diagram of a truck assembly.

To this extent, FIG. 6 shows an illustrative physical diagram of a truck assembly 8. As illustrated, the wheels 2 are connected to and support the truck assembly 8. The truck assembly includes openings 6A, 6B through which the brake assemblies 4A, 4B can be seen. When viewing from a side angle as shown in FIG. 6, only a top portion of the brake assemblies 4A, 4B are typically visible. However, depending on an angle of vision, a lower portion of each brake assembly 4A, 4B may project below the truck assembly 8 and therefore be visible. In general, rail vehicles 1 include an even number of wheel sets. As illustrated, the corresponding brake assemblies 4A, 4B for each pair of axles on a truck assembly 8 are mounted in mirror symmetry for each axle. As a result, regardless of a direction of travel of the truck assembly 8, each odd wheel passing an imaging area will have the corresponding brake assembly located on a trailing edge of the wheel 2, while each even wheel will have the corresponding brake assembly located on a leading edge of the wheel 2. However, the sides of the trailing and leading edges will vary depending on the direction of travel of the truck assembly 8.

Figure 1:
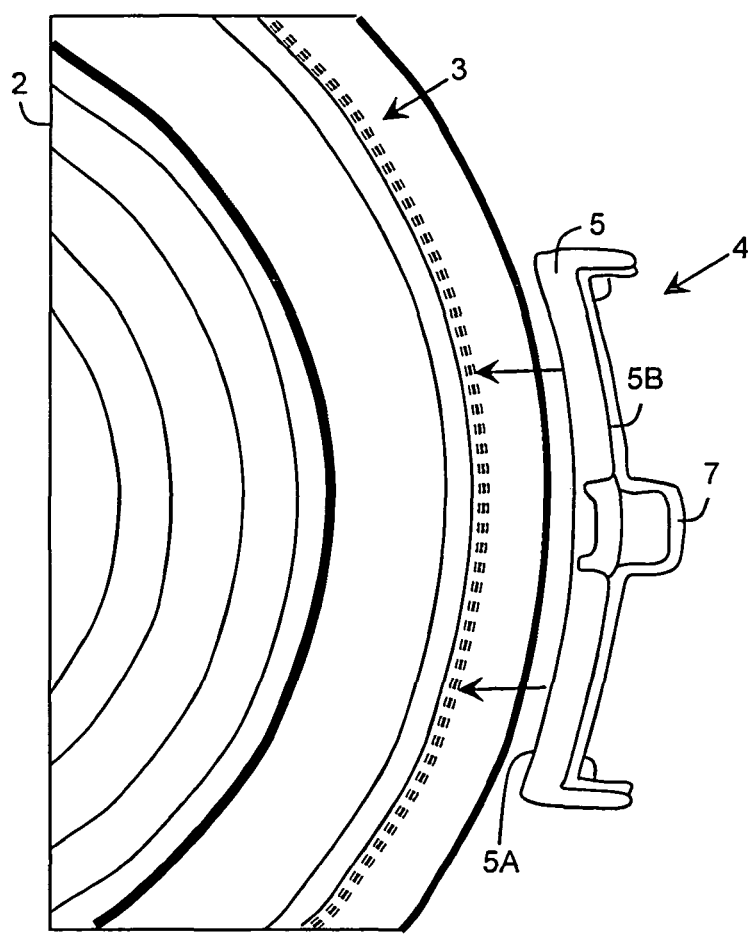
FIG. 1 shows an illustrative rail car shoe brake according to the prior art.

The accuracy of an evaluation using a machine vision-based solution depends on the resolution of the imaging device 44 (FIG. 3) used to acquire the image data for metrology. In an embodiment, a field of view 46 of the imaging device(s) 44 is kept relatively narrow to permit the brake assemblies 4A, 4B to be imaged with a resolution capable of providing sufficiently accurate measurements of the components of the brake assemblies 4A, 4B (e.g., a thickness of the brake pad 5 (FIG. 1)). For example, the resolution can be sufficient to enable a measurement accuracy of ±0.02 inches. However, as illustrated, such a narrow field of view 46 cannot acquire image data for both brake assemblies 4A, 4B in a single image. Furthermore, since the location of the brake assembly 4A, 4B with respect to the wheel 2 differs depending on whether the wheel 2 is an odd wheel (i.e., first wheel of a truck assembly 8) or an even wheel (i.e., second wheel of a truck assembly 8), determination of the time to acquire the image for a wheel 2 differs for odd/even wheels.

In an embodiment, the environment 10 (FIG. 2) includes three wheel sensors 66A-66C for determining the timing for acquiring the image data for a wheel 2 as it passes through the field of view 46. It is understood that three wheel sensors 66A-66C enable the environment 10 to acquire image data regardless of a direction of travel for the rail vehicles 1 at the location and/or to detect when the direction of travel of the rail vehicles 1 changes (e.g., as can occur in a classification yard, such as a hump yard). For locations in which the direction of travel is known and cannot vary, fewer wheel sensors 66A-66C can be utilized. Similarly, for some embodiments, additional wheel sensors can be utilized. Additionally, while the wheel sensors 66A-66C are shown having a spacing in which the two end wheel sensors 66A, 66C are spaced approximately the distance between two axles of a truck assembly 8 and the third wheel sensor 66B is located approximately in the center of the field of view 46, it is understood that any appropriate spacing of the wheel sensors 66A-66C can be utilized.

In any event, assuming a direction of travel for the truck assembly 8 from left to right, a first activation of the wheel sensor 66A indicates that the first ("odd") wheel is entering the field of view 46. Since the first wheel is an odd wheel, the brake assembly 4B is on a trailing edge of the wheel 2. When the first wheel activates the wheel sensor 66B, the speed of the truck assembly 8 can be calculated (using a known distance between the wheel sensors 66A, 66B and the amount of time between the activations) and a time at which the trailing edge of the wheel 2 is within a central portion of the field of view 46 can be calculated. The imaging device(s) 44 can acquire the image data for the first wheel at a time corresponding to the calculated time. Subsequently, the second ("even") wheel 2 will activate the wheel sensor 66A and the previously calculated speed (or an updated speed based on activation of the third wheel sensor 66C by the first wheel) can be used to determine a time at which to acquire the image data for the leading edge of the wheel 2 as it passes through the field of view 46. The imaging device(s) 44 can acquire the image data for the second wheel at a time corresponding to the calculated time.

It is understood that the imaging solution described above is only illustrative. For example, in an alternative embodiment, a pair of wheel sensors can be located on either side of the central portion of the field of view 46 rather than the single sensor 66B. The wheel sensors can be located such that one wheel sensor is triggered when an odd wheel 2 is located at a desired imaging location and the other wheel sensor is triggered when an even wheel 2 is located at a desired imaging location. In response to a corresponding wheel sensor being triggered for an odd or even wheel 2, a supporting component 52 can trigger the imaging device(s) 44 to acquire image data.

Referring to FIGS. 4 and 6, when utilized, the illumination device(s) 50A-50D can be horizontally displaced from the imaging device(s) 44A-44B, e.g., by a distance of approximately one foot. In this case, light from an illumination device 50A-50D can create shadows in the image data acquired by the corresponding imaging device 44A-44B. During processing by the computer system 20, the light and shadow cues present in the image data can be used to interpret the fine structure present in the image data. For example, the computer system 20 can use the various cues to locate the wheel 2, brake pad 5 (FIG. 1), brake shoe 7 (FIG. 1), and where the various objects are separated. By identifying the separation points, the computer system 20 can calculate an accurate measurement of the thickness of the brake pad 5.

Furthermore, the illumination device(s) 50A-50D can be vertically displaced from the imaging device(s) 44A-44B, for example, by a distance of approximately six to twelve inches. In this case, the light from the illumination device(s) 50A-50D will be able to illuminate the holes 6A, 6B regardless of variations in the elevations and relative locations of the holes 6A, 6B due to variations in size or design of the truck assemblies 8, wheels 2, and/or the like.

Returning to FIG. 2, the computer system 20 can receive data corresponding to the image data from the imaging component 40, which the computer system 20 can store as evaluation data 34. The data received from the imaging component 40 can include the raw image data, preprocessed image data, data corresponding to one or more attributes of the image data (e.g., timestamp, wheel/rail vehicle number, location, and/or the like), and/or the like. Regardless, the computer system 20 (or the imaging component 40, when it includes sufficient computing power) can process the image data to measure a thickness of the brake pad 5 (FIG. 1) included in the image data for each wheel 2 of a rail vehicle 1 using any solution. For example, the computer system 20 can perform one or more of: adaptive contrast enhancement with adaptive thresholding; blob/object definition and assignment of properties; apply known geometric/measurement limits to determine which of the target objects is the brake pad 5; and/or the like, to measure the brake pad 5 thickness using the image data.

The computer system 20 can store the brake pad thickness as evaluation data 34. Furthermore, the computer system 20 can communicate data corresponding to the evaluation of a rail wheel 2 to one or more users 12. In an embodiment, the environment 10 is implemented in a classification yard. In this case, the imaging component 40 can be located to acquire image data for rail vehicles 1 entering or preparing to depart the classification yard and prevent a rail vehicle 1 from proceeding out of the classification yard and on potentially long journeys with one or more significant flaws in its braking system. The user 12 can be a classification yard control center, which can re-route a rail vehicle 1 evaluated as including one or more inadequate brake assemblies 4 (FIG. 1) for further evaluation and/or repair. Similarly, the computer system 20 can communicate data corresponding to the evaluation to an operator of a train including the rail vehicles 1, which can take one or more actions in response to the evaluation, such as traveling at a slower rate, stopping the train, scheduling maintenance at a future stop, and/or the like.

For some imaging environments (e.g., other than those in an enclosed area with the rail vehicles traveling at low speeds in controlled lighting conditions), the lighting present while acquiring the image data will be highly variable. Furthermore, the object shapes within the image data also can be quite variable due to, for example, different brake shoe/pad designs, different trucks and support components, and/or the like. Still further, a considerable amount of clutter can be present in the imaged scene. A combination of these factors can make standard approaches to image processing unreliable and/or unworkable.

In an embodiment, the computer system 20 can implement a lighting-independent solution for evaluating a brake assembly 4 present in the acquired image data. For example, as shown in FIG. 4, a pair of imaging devices 44A, 44B can be used to concurrently acquire image data for a brake assembly 4 with overlapping fields of view 46A, 46B. The overlapping area of the fields of view 46A, 46B can provide a sufficient area to enable the computer system 20 to merge the separate image data into a single image using any solution. For example, the computer system 20 can implement a stitching process to merge two or more images. Alternatively, a spatial relationship between objects in the fields of view 46A, 46B can be determined during installation, e.g., by a calibration process, and the computer system 20 can use the known spatial relationships to merge the image data. The computer system 20 can use the single image and known relationships between the top and bottom portions of the brake assembly 8 and other components in the imaged scene for a greater understanding of the entire imaged scene.

Figure 7:
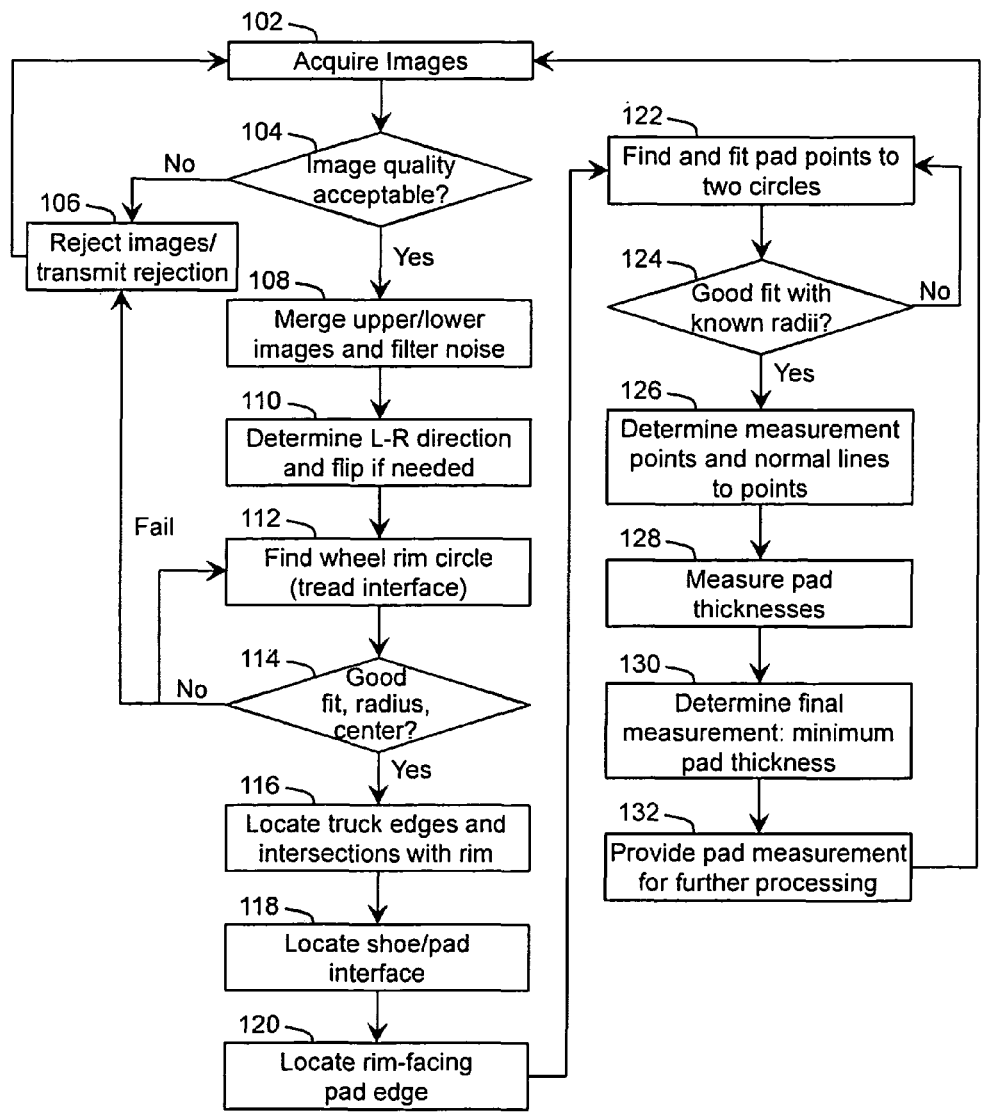
FIG. 7 shows an illustrative process for evaluating a brake assembly according to an embodiment.

The computer system 20 (FIG. 1) can be configured to process the image data in order to define, extract, enhance, and identify critical signals/components of signals which permit the diagnosis of various possible detectable flaws or anomalies. To this extent, FIG. 7 shows an illustrative process for evaluating a brake assembly 4 (FIG. 1), which can be implemented by the computer system 20, according to an embodiment. Referring to FIGS. 2 and 7, in action 102, the computer system 20 receives image data acquired by the imaging component 40 and/or a user 12. In action 104, the computer system 20 can determine whether the quality of the image data is acceptable using any solution. For example, the computer system 20 can determine whether the image data is too light or dark to distinguish the objects, includes too much blurring, and/or the like. If the image data is not acceptable, in action 106 the computer system 20 can reject the image data (either discarding the image data or storing it as evaluation data 34 for later processing). Furthermore, the computer system 20 can transmit data corresponding to the rejection for processing by the imaging component 40. The imaging component 40 can take one or more actions in response to the rejection. For example, when a sufficient number/frequency of rejections is received indicating the same reason, the imaging component 40 can adjust an amount of lighting, adjust a location of an illumination device, use an alternative illumination and/or imaging device, adjust a focus of an imaging device, and/or the like.

When the image data is acceptable, in action 108, the computer system 20 can merge the upper and lower image data using any solution. For example, the computer system 20 can use a normalized cross-correlation of the image data to detect the points of overlap, e.g., using a stitching process, a known spatial relationship between objects in the fields of view 46A, 46B, and/or the like. Furthermore, the computer system 20 can filter noise from the image data using any solution, and crop the image data to eliminate any artifacts from the merging process and generate a fixed frame of image data including the brake assembly 4. In action 110, the computer system 20 can determine an orientation of the brake assembly using any solution. As described herein, the brake assemblies 4A, 4B (FIG. 6) on a truck assembly 8 (FIG. 6) have opposite horizontal orientations. To this extent, the computer system 20 can flip the image data corresponding to every other wheel 2. Alternatively, the computer system 20 can examine the image data to determine the orientation using any solution. For example, the computer system 20 can identify an orientation of the opening 6A, 6B (FIG. 6) in the image data, an orientation of an angled portion of the truck assembly 8, and/or the like, using any solution. In an embodiment, the computer system 20 can horizontally flip the image data for brake assemblies 4A, 4B corresponding to one of the orientations (left or right) to enable further analysis to be applied only for brake assembly 4A, 4B image data having a single orientation. However, it is understood that the computer system 20 can be configured to analyze the image data for each brake assembly 4A, 4B without flipping the image data.

In action 112, the computer system 20 can identify a wheel rim circle in the image data. In particular, the computer system 20 can identify a set of arcs in the image data corresponding to the portion(s) of the tread surface 3 (FIG. 1) of the wheel 2 that were imaged and can calculate the corresponding circle, e.g., using a circle-point finding solution, such as Hough circles, or the like. In action 114, the computer system 20 can determine if a set of attributes of the calculated wheel rim circle are acceptable. For example, the computer system 20 can check the circle for goodness of fit with the image data, determine if the calculated radius and center are appropriate based on known factors, such as wheel diameters, geometry of cameras and fields of view, triggering/timing of the image acquisition, and/or the like. When the computer system 20 determines that the calculated wheel rim circle is not acceptable, the computer system 20 can return to action 112 to repeat the wheel rim circle finding process. When the computer system 20 is unable to identify an acceptable wheel rim circle (e.g., after a number of attempts) in the image data, the computer system 20 can return to action 106 and reject the image data.

After identifying an acceptable wheel rim circle, in action 116, the computer system 20 can locate the upper and lower edges of the strut of the truck assembly 8 and the intersections of the strut edges of the truck assembly 8 with the rim circle using any solution, such as Hough lines. The strut of the truck assembly 8 defines the bottom right portion of the opening 6 in FIG. 5 and the lower outer edge of the truck assembly 8 below which a portion of the brake assembly 4 may be visible. The intersection points can be used by the computer system 20 to define a region of interest for further analysis of the image data.

With the region of interest defined, in action 118, the computer system 20 can identify an interface between the brake shoe 7 and the brake pad 5 using any solution. For example, the computer system 20 can perform a normalized cross-correlation matching using a set of cross-correlation templates for the upper and lower brake regions to find a best-case estimate for the interface. Using the estimate, the computer system 20 can determine the upper and lower intersection points of the interface between the brake shoe 7 and the brake pad 5. In action 120, the computer system 20 can locate a rim-facing edge 5A (FIG. 1) of the brake pad 5 using any solution. For example, the computer system 20 can use the interface between the brake shoe 7 and the brake pad 5 and the wheel rim to truck assembly 8 intersection points (e.g., at the upper and lower portions of the strut) to define a rim-facing region of interest along the upper and lower portions of the strut of the truck assembly 8 (e.g., which forms a bottom portion of the opening 6 and a lower edge of the truck assembly 8). Within the rim-facing region of interest, the computer system 20 can locate the rim-facing edge 5A of the brake pad 5 using any solution, such as cross-correlation template matching using a set of cross-correlation templates for the rim-facing edge 5A of the brake pad 5. Prior knowledge of a maximum possible pad thickness (e.g., a brand new brake pad 5), can be used by the computer system 20 as an upper bound for the location of the rim-facing edge 5A. The computer system 20 also can determine intersection points of a line corresponding to the rim-facing edge 5A with the lower portion of the opening 6 and an upper portion of a lower edge of the truck assembly 8 from which the lower portion of the brake pad 5 can be visible.

In action 122, the computer system 20 can fit a circle corresponding to the interface 5B (FIG. 1) between the brake shoe 7 and the brake pad 5 and a circle corresponding to the rim-facing edge 5A of the brake pad 5 using any solution. For example, the computer system 20 can apply a gradient-based adaptive line finding to "crawl" the lines corresponding to the edges 5A, 5B to the respective key points, thereby creating two curved sets of data points, each of which can represent a segment of the corresponding circle of interest. In action 124, the computer system 20 can test the fit for a goodness of fit using a known radii and a standard deviation of the estimators. For example, the radius of the rim/pad interface 5B should be substantially identical to the radius of the wheel rim circle. Furthermore, the computer system 20 can use manufacturer's standards to test the fit. For example, for a brake assembly 4, the manufacturer's standards can require that the radius of the interface 5B between the brake shoe 7 and the brake pad 5 be exactly seventeen inches. If the computer system 20 determines that the fit is poor, the computer system 20 can repeat the fitting process using data from the rejected fit to modify the process. If no good fit can be found (e.g., after a predetermined number of attempts), the computer system 20 can reject the image data as described herein.

When both circles have a good fit, in action 126, the computer system can determine precise points for measurements and generate lines normal to the selected circle (e.g., rim/pad interface). In an embodiment, the computer system 20 can use several measurement points as a thickness of the brake pad 5 can significantly vary across the brake pad 5. However, the computer system 20 can use only one or more points adjacent to the extrema (e.g., top and bottom) of the defined brake pad 5. In an embodiment, the points used in the evaluation are located some distance from the extrema in order to avoid, for example, a chip located at an extremum from causing an otherwise good brake pad 5 to be rejected.

In action 128, the computer system 20 can calculate a set of measurements of the thickness of the brake pad 5. For example, the computer system 20 can calculate a thickness of the brake pad 5 at points adjacent to the extrema of the fitted circles corresponding to the top and bottom surfaces of the brake pad 5. The computer system 20 can use the length of a line segment delineated by an intersection of a normal with the rim/pad circle and the shoe/pad circle previously determined. In action 130, the computer system 20 can determine a final brake pad 5 thickness measurement using any solution. For example, the computer system 20 can use a minimum thickness in the set of measurements of the thickness of the brake pad 5 previously calculated. However, it is understood that this is only illustrative of various solutions that can be utilized.

In action 132, the computer system 20 can provide the final brake pad 5 thickness measurement for further processing. For example, the computer system 20 can store the thickness measurement as evaluation data 34. Additionally, the computer system 20 can evaluate the thickness measurement with respect to a minimum required thickness. However, it is understood that actions 128-132 are only illustrative. For example, instead of measuring a pad thickness, the computer system 20 can determine whether the thickness of the pad is above or below a threshold. For some brake pads 5, the image data will indicate that the brake pad 5 clearly has sufficient thickness. Similarly, for other brake pads 5, the image data will clearly indicate that the brake pad 5 is too thin. In these cases, the computer system 20 can provide a result of the evaluation (e.g., that the brake pad 5 is sufficiently thick or too thin) without calculating a precise measurement of the thickness as described herein. Alternatively, the precise thickness measurement can be calculated, for example, for tracking the pad thickness over time.

Regardless, when the computer system 20 determines that the thickness of the brake pad 5 is below the minimum required thickness or within a minimum acceptable range of the minimum required thickness, the computer system 20 can initiate one or more actions. For example, the computer system 20 can notify a user 12, such as a maintenance system, of the evaluation. The notification can identify the location of the brake pad 5, e.g., by the rail vehicle 1 and a location on the rail vehicle 1, the measured thickness, and/or the like. In response, the user 12 can flag the rail vehicle 1 for maintenance/inspection, reroute the rail vehicle 1 for maintenance/inspection, and/or the like. In an embodiment, the computer system 20 is a track management system, e.g., as part of a classification yard. In this case, the computer system 20 can automatically route the rail vehicle 1 based on the brake pad evaluation (e.g., to a shop track for servicing or to a destination track if no problem is identified), provide a notification to a maintenance user 12 of an identified problem, transfer data to a computer system in the maintenance area (e.g., a condition based maintenance system) for processing/analysis, and/or the like.

In general, the computer system 20 can perform the process shown in FIG. 7 to provide a completely automated evaluation of the brake assemblies 4 of rail vehicles 1. Furthermore, the computer system 20 can implement a semi-automated evaluation process, which can improve both the immediate evaluation accuracy of passing rail vehicles 1 as well as the long term performance of an automated evaluation process described herein.

Figure 8:
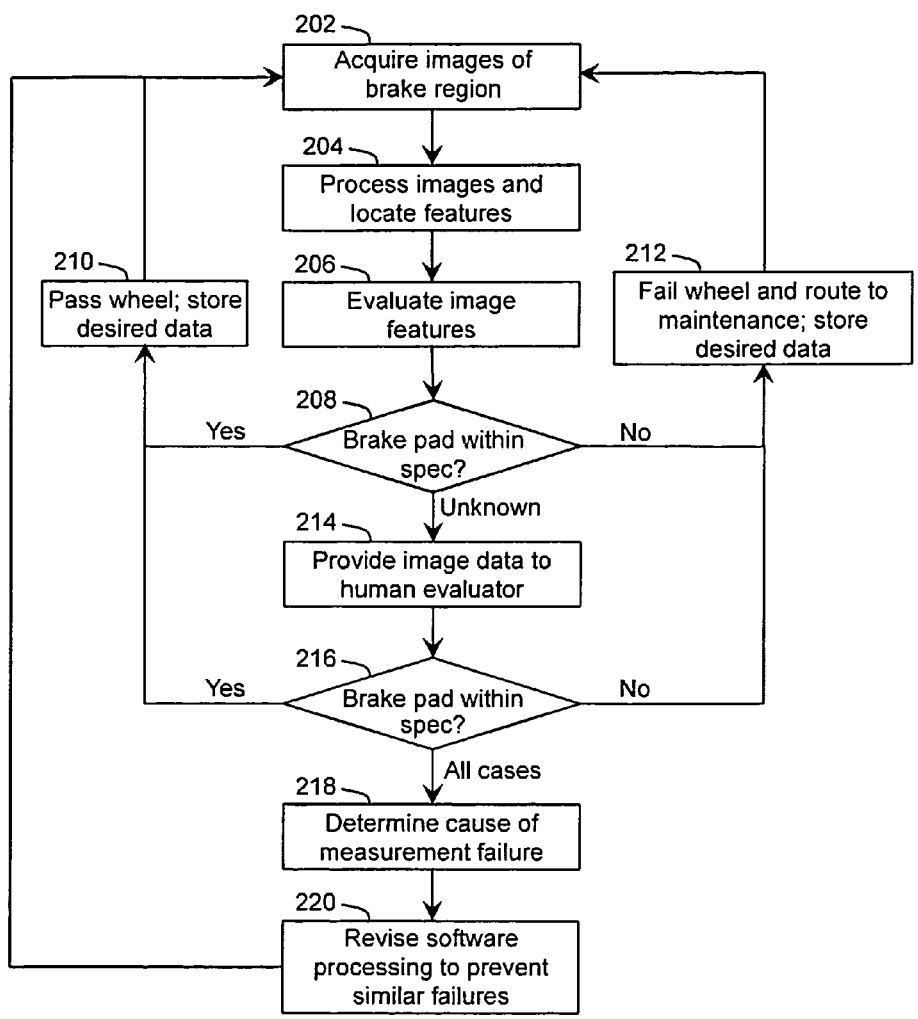
FIG. 8 shows an illustrative evaluation and feedback process according to an embodiment.

To this extent, FIG. 8 shows an illustrative evaluation and feedback process, which can be implemented using the computer system 20, according to an embodiment. Referring to FIGS. 2 and 8, in action 202, the computer system 20 can acquire image data of a brake region on a rail vehicle 1 as described herein. In action 204, the computer system 20 can process the image data and locate various important features corresponding to the brake assembly 4 (FIG. 5) and components thereof. For example, the computer system 20 can perform actions 104-126 as described with reference to FIG. 7. In action 206, the computer system 20 can evaluate the image features, e.g., by performing actions 128-132 as described with reference to FIG. 7.

As described herein, the automated processing of image data for a particular brake assembly 4 by the computer system 20 in FIG. 7 can end either with the image data being rejected in action 106 or with data corresponding to one or more measurements being provided in action 132. To this extent, in action 208, the computer system 20 can determine whether the brake pad 5 is acceptable (e.g., within spec), unacceptable, or whether the automated image data processing failed, and therefore the condition of the brake pad 5 remains unknown. If the evaluation data indicates that the brake pad 5 is acceptable (e.g., remains sufficiently thick), the process can proceed to action 210, where the computer system 20 can indicate that the wheel 2 passed, store data corresponding to the evaluation, and/or the like, and return to action 202 to evaluate the brake assembly 4 for another wheel 2. Similarly, if the evaluation data indicates that the brake pad 4 is not acceptable (e.g., is too thin, missing, broken, and/or the like), the process can proceed to action 212, in which the computer system 20 can indicated that the wheel 2 failed, route the rail vehicle 1 to a maintenance facility, store data corresponding to the evaluation, and/or the like, and return to action 202 to evaluate the brake assembly 4 for another wheel 2.

However, when the automated evaluation fails, the status of the brake pad 5 remains unknown. In action 214, the computer system 20 can provide the image data to a human evaluator (e.g., a user 12), who can manually evaluate the brake assembly 4 using the image data. In action 216, the user 12 can provide a result of the manual evaluation. For example, the user 12 can review the image data (raw, filtered, and/or the like), as well as one or more features identified in the image data by the computer system 20, if available. The user 12 can use the data to determine whether the brake assembly 4 for the wheel 2 is acceptable or not, and provide the result to the computer system 20. In the event the user 12 can either pass or fail the wheel 2, the computer system 20 can proceed to the corresponding actions 210, 212, respectively. When the user 12 cannot evaluate the brake assembly 4 (e.g., bad image data, obstructed view, and/or the like), the user 12 can either require manual inspection of the wheel 2 or fail or pass the wheel 2 based on one or more factors, such as one or more attributes of the image data, one or more attributes of the rail vehicle 1 (e.g., signs of damage, not recently inspected, and/or the like), and/or the like.

Regardless, when the image data for the brake assembly 4 requires manual inspection in action 214, the computer system 20 can proceed to action 218, in which a cause of the failure of the automated measurement and/or evaluation process can be determined. For example, the computer system 20 can provide data corresponding to the evaluation process for analysis by a user 12, who can examine the data and determine what feature or features in the image data caused the automated process to be unable to evaluate the brake assembly 4. In response, in action 220, one or more settings of the automated process can be modified to enable successful automated evaluation should a similar situation occur again. Furthermore, one or more attributes of the imaging component 40 can be modified to improve the image data acquired for the passing rail vehicles 1. In this manner, the computer system 20 can improve its image acquisition and/or image processing using feedback from actual field experience in a deployment location. Over time, the process can result in a number of unknown evaluations being substantially reduced as various confounding variables are eliminated, thereby steadily reducing the manpower demands of the environment 10 to a very low level.

While aspects of the invention have been primarily described with respect to measurement of a thickness of the brake pads 5 on various brake assemblies 4, it is understood that the computer system 20 can perform other brake-related evaluations using the image data acquired by the imaging component 40. For example, the computer system 20 can identify when a brake pad 5 is missing, broken, and/or the like. To this extent, in any of the actions 118, 120, 122 described herein, the computer system 20 can determine that the brake pad 5 is missing or broken and return the evaluation for further processing in response to the determination. Similarly, the computer system 20 can identify one or more problems with the other components of the brake assembly 4, such as a broken brake shoe 7, a missing/broken key, and/or the like. Other brake components, such as a brake hose, also can be damaged or worn and can be evaluated by the computer system 20. When evaluating the brake hose, the computer system 20 can determine whether the image data includes any features indicating excessive wear or damage, such as a discontinuity in color, shape, and/or the like. Still further, it is understood that the environment 10 can be configured to acquire and the computer system 20 can evaluate additional types of data for a vehicle. For example, the environment 10 can be configured to detect radiation, exhaust leaks, frame cracking, and/or the like.

Since an operating environment, and therefore the image data acquired by the imaging component 40, can include various anomalies such as dirt, snow, ice, and/or the like, the environment 10 can be configured to discriminate between the brake assembly 4 and such anomalies. For example, the image data acquired by the imaging component 40 can be in color. In this case, the computer system 20 can extract features in both color and grayscale, which can enable the computer system 20 to identify discontinuities that may represent changes in composition. The computer system 20 also can use geometric heuristics. For example, the computer system 20 can evaluate whether the brake pad 5 and/or the surrounding components of the truck assembly 8 deviate from certain basic expected shapes in a significant manner. If so, the computer system 20 can attempt to identify whether the deviation is due to an anomaly, such as a blob of grease, a piece of ice, and/or the like, which the computer system 20 can discount from the evaluation of the brake assembly 4. Furthermore, the image data can include both visible and infrared image data, which the computer system 20 can combine to produce fused image data having features not present in the individual image data. The computer system 20 can evaluate the fused image data to distinguish, for example, between a brake assembly 4/wheel 2, which can become heated due to use and would appear brighter than ice or many encrustations of grease or dirt, which will not have been directly subjected to heating from friction. Similarly, the computer system 20 can use the fused data to accurately locate the brake pad 5, which can be significantly warmer than the surroundings when the rail vehicle 1 is using or has recently used the brake system (e.g., upon entry to a rail yard).

Additionally, the computer system 20 can perform processing of the image data, which enables various anomalies to be ignored in the evaluation and/or estimations to be obtained for certain measurements. For example, the computer system 20 can measure the brake pad 5 thickness at multiple intervals. The measurement data enables the computer system 20 to perform averaging, outlier elimination, trending/projection analysis, and/or the like. Using such analysis, the computer system 20 can identify portions of the brake pad 5 that are obscured in an unusual way, e.g., a large buildup of ice in the opening 6 (FIG. 5) through which the brake pad 5 is normally visible. Additionally, the computer system 20 can project the thickness of the brake pad 5 based on a portion of the brake pad 5 that remains visible, thereby providing a reasonable confidence in determining whether the obscured portion is likely or unlikely to be within operating specifications.

The evaluation data 34 also can include data corresponding to one or more previous evaluations of a brake assembly 4. In this case, the computer system 20 can use the previous evaluation data to perform long term trending regarding the brake assembly 4. The computer system 20 can use such long term trending to eliminate periodic bad images from any decision making regarding the brake assembly 4, eliminate false positives, and/or the like. Furthermore, the computer system 20 can use a combination of the trending data for multiple brake assemblies 4 to track wear and use associated with a particular operator, project maintenance requirements and/or implement preventive maintenance for a fleet of vehicles, and/or the like.

Figure 9:
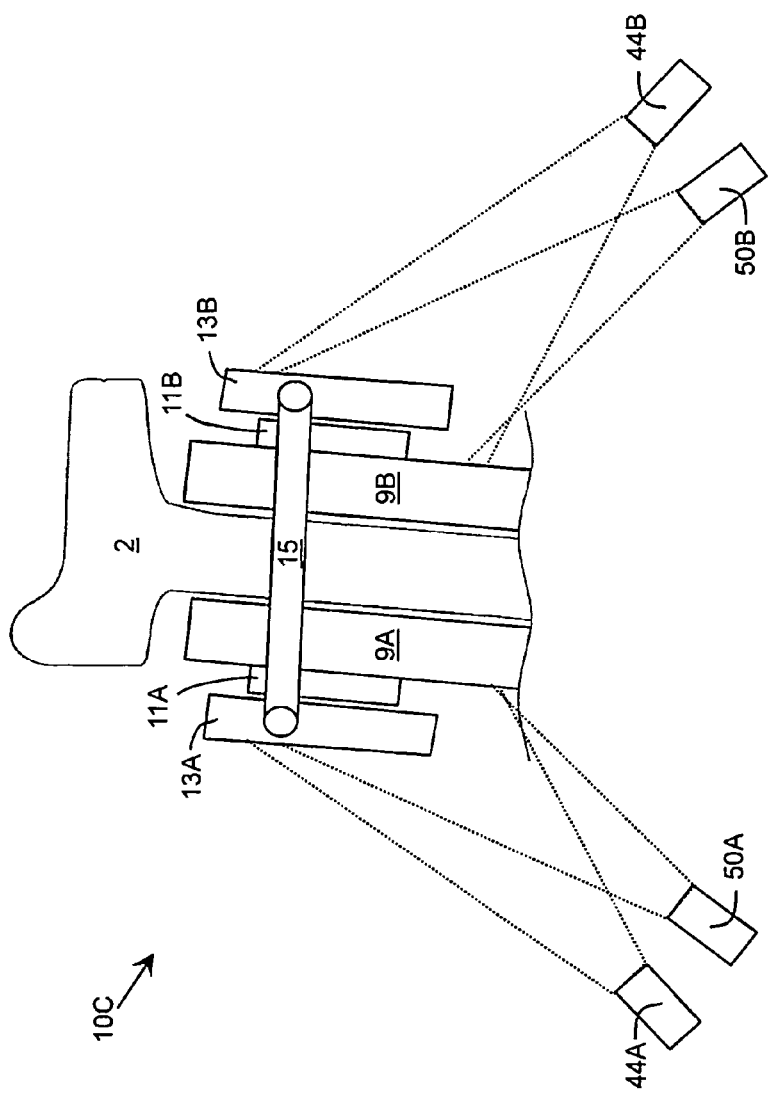
FIG. 9 shows an illustrative physical diagram for imaging disc brakes according to an embodiment.

While aspects of the invention have been described primarily with reference to the evaluation of rail car shoe brakes, it is understood that aspects of the invention can be directed to various other vehicular (rail and non-rail) inspection applications. To this extent, an embodiment of the invention can evaluate another type of brake on a rail vehicle. For example, FIG. 9 shows an illustrative physical diagram of an environment 10C for imaging disc brakes according to an embodiment, which are frequently implemented for transit rail vehicles. As illustrated, the disc brakes can include a rotor disc 9A, 9B and a caliper 13A, 13B on each side of a wheel 2, with a pad 11A, 11B located there between. Furthermore, an activation mechanism 15 can be included to control activation/deactivation of the disc brakes. Alternatively, the rotor disc, caliper, and pads can be included on only a single side of the wheel 2, e.g., an inner portion of the axle.

The imaging component 40 (FIG. 1) can include at least one imaging device 44A, 44B for each side of the wheel 2 on which the rotor disc 9A, 9B is located. Furthermore, the imaging component 40 can include an illumination device 50A, 50B for each side of the wheel 2 to be imaged. As illustrated, the imaging and illumination devices can be located below and between the rails and/or below and adjacent to the field side of the rails with the imaging devices 44A, 44B and illumination devices 50A, 50B directed upward to acquire the image data. It is understood that the imaging component 40 can include one or more protective closures, stabilizing mechanisms, and/or the like, for the imaging devices 44A, 44B and the illumination devices 50A, 50B. As described herein, the illumination devices 50A, 50B can emit any type of electromagnetic radiation. In an embodiment, the illumination devices 50A, 50B can be multiple line laser sheet projectors, which emit a plurality of laser lines (e.g., three to five) that are directed onto the disc brake components.

Once the image data is acquired by the imaging devices 44A, 44B, the computer system 20 can perform substantially similar processing as that described herein in order to evaluate the disc brake. For example, the evaluation can include measuring wear of a shoe on a caliper 13A, 13B, measuring wear on the pads, 11A, 11B, identifying damage on a rotor 9A, 9B, and/or the like. To this extent, the computer system 20 can detect the visible edges of the rotors 9A, 9B, the pads 11A, 11B, and the calipers 13A, 13B and perform measurements based on the known geometry of the imaging system. When the illumination devices 50A, 50B emit structured light (e.g., multiple lines of light), the computer system 20 can use calibration data acquired during calibration of the illumination devices 50A, 50B and the imaging devices 44A, 44B to calculate three dimensional points corresponding to the visible three dimensional structure and the orientation of the imaging device 44A, 44B with respect to the illumination device 50A, 50B, e.g., using structured light triangulation.

Furthermore, an embodiment of the invention can be directed to the evaluation of non-rail based vehicles, such as commercial vehicles. While the view lines to the braking components may be different and may require an in-road installation of a sensor assembly over which the vehicles travel, the computer system 20 can perform substantially similar processing as that described herein in order to evaluate the brakes of the vehicles. However, in addition to the processing described herein, the computer system 20 can determine an exact distance to a target wheel, which unlike in a rail environment, can vary by a significant amount. The computer system 20 can determine the distance using any of various solutions. For example, the sensor assembly can include a laser range finder, which can be concurrently triggered with the imaging device(s) to acquire a precise value of the distance of the target at a center of the field(s) of view of the imaging device(s). Furthermore, the range finder can project a pattern (e.g., a grid) on the passing object, which can clearly delineate the target objects and assist the computer system 20 in determining the exact geometry. Regardless, other solutions, such as radar (standard, millimeter-wave, and/or the like), acoustic range finding, and/or the like, can be implemented and provide the computer system 20 with data corresponding to the distance.

While shown and described herein as a method and system for evaluating a component, such as a brake assembly, of a vehicle, it is understood that aspects of the invention further provide various alternative embodiments. For example, in one embodiment, the invention provides a computer program fixed in at least one computer-readable medium, which when executed, enables a computer system to evaluate a component of a vehicle. To this extent, the computer-readable medium includes program code, such as the evaluation program 30 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the evaluation program 30 (FIG. 2), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for evaluating a component of a vehicle. In this case, a computer system, such as the computer system 20 (FIG. 1), can be obtained (e.g., created, maintained, made available, etc.) and one or more components, such as the imaging component 40 (FIG. 1), for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
an imaging component including:
a first imaging device configured to acquire image data for a target area corresponding to a target component of a vehicle when the target area is within a field of view of the first imaging device, wherein the first imaging device has one of: a downward or an upward angle with respect to the target area;
first and second illumination devices configured to concurrently direct electromagnetic radiation on the target area during acquisition of the image data, wherein the first and second illumination devices are horizontally and vertically offset from the first imaging device, and wherein the first and second illumination devices are located on opposite sides of the target area along a plane substantially orthogonal to an optical axis of the first imaging device to illuminate substantially all of the imaged portion of the target component of the vehicle from opposing sides of the target area, wherein the target component of the vehicle is partially obstructed by at least one obstructing component of the vehicle located in front of the target component in the image data; and
a computer system for evaluating the target component of the vehicle only partially visible in the target area using the image data by performing a method comprising:
locating a region of interest within the image data by identifying intersection points in the image data between a component of the vehicle adjacent to the target component and the at least one obstructing component, wherein the region of interest corresponds to a location where the target component is expected to be partially visible behind the at least one obstructing component;
identifying a set of points in the image data corresponding to at least two edges of the target component visible in the region of interest, wherein the set of points are found using the intersection points in the image data to define the region of interest, and wherein the identifying includes identifying a separation point between the target component and at least one other adjacent component of the vehicle; and
calculating a measurement for at least one attribute of the target component using the set of points.

2. The system of claim 1, wherein the imaging component further includes a second imaging device configured to acquire image data for the target area, wherein the first imaging device is located above the target area and has a downward angle with respect to the target area and the second imaging device is located directly below the first imaging device below the target area and has an upward angle with respect to the target area, wherein at least a portion of the target component remains obstructed in the image data acquired by both the first and second imaging devices, and wherein the method further includes merging the image data acquired by the first and second imaging devices into a single image prior to the locating.

3. The system of claim 2, wherein the target component is a brake assembly of a rail vehicle partially obstructed by a truck assembly of the rail vehicle, and wherein the first imaging device is configured to acquire image data for a first portion of the brake assembly looking downward through an opening in the truck assembly and the second imaging device is configured to acquire image data for a second portion of the brake assembly looking upward from below the truck assembly.

4. The system of claim 1, wherein the method further includes:
comparing the measurement for the at least one attribute of the target component with an acceptable value range for the at least one attribute; and
initiating an action in response to the at least one attribute being outside the acceptable value range.

5. The system of claim 4, wherein the action includes at least one of: notifying an operator of the vehicle, rerouting the vehicle, or scheduling the vehicle for maintenance.

6. A system comprising:
an imaging component including:
a first imaging device configured to acquire image data for a target area corresponding to a brake assembly of a rail vehicle when the target area is within a field of view of the first imaging device, wherein the first imaging device has one of: a downward or an upward angle with respect to the target area; and
first and second illumination devices configured to direct electromagnetic radiation on the target area during acquisition of the image data, wherein the first and second illumination devices are horizontally and vertically offset from the first imaging device, and wherein the first and second illumination devices are located on opposite sides of the target area along a plane substantially orthogonal to an optical axis of the first imaging device to illuminate the substantially all of imaged portion of the brake assembly of the rail vehicle from opposing sides of the target area, wherein the brake assembly is partially obstructed by at least one obstructing component of the rail vehicle located in front of the brake assembly in the image data; and a computer system for evaluating the brake assembly using the image data by performing a method comprising:

locating a region of interest within the image data by identifying intersection points in the image data between the at least one obstructing component of the rail vehicle and a rail wheel located adjacent to the brake assembly, wherein the region of interest corresponds to a location where the brake assembly is expected to be partially visible behind the at least one obstructing component;

identifying a set of points in the image data corresponding to at least two edges of the brake assembly, wherein the set of points are found using the intersection points in the image data to define the region of interest, and wherein the identifying includes identifying a separation point between the brake assembly and at least one other adjacent component of the vehicle; and calculating a measurement for at least one attribute of the brake assembly using the set of points.

7. The system of claim 6, wherein the imaging component further includes a second imaging device configured to acquire image data for the target area, wherein the first imaging device is configured to acquire image data for a first portion of the brake assembly through an opening in a truck assembly and the second imaging device is configured to acquire image data including a second portion of the brake assembly visible from below the truck assembly, and wherein the method further includes merging the image data acquired by the first and second imaging devices into a single image prior to the locating.

8. The system of claim 6, further comprising a set of rail wheel detectors configured to signal when a rail wheel is detected, wherein the method further includes:

determining a time for acquiring the image data for a rail wheel based on a set of signals generated by the set of rail wheel detectors; and triggering the first imaging device to acquire the image data based on the time.

9. The system of claim 8, wherein the set of rail wheel detectors includes at least two rail wheel detectors located on opposing sides of a field of view of the first imaging device, and wherein the determining is different for each odd rail wheel and each even rail wheel.

10. The system of claim 6, wherein the calculating includes determining a thickness of a brake pad of the brake assembly in a plurality of locations.

11. The system of claim 10, wherein the plurality of locations include a location adjacent to a top extremum and a location adjacent to a bottom extremum of the brake pad.

12. The system of claim 10, wherein the determining includes projecting a thickness of an obscured portion of the brake pad using the set of points.

13. A method comprising:

evaluating a brake assembly using image data for a target area of a rail vehicle, wherein the image data is acquired by an imaging device having one of: a downward or an upward angle with respect to the target area while the target area is illuminated by a pair of horizontally and vertically offset illumination devices located on opposing sides of the target area along a plane substantially orthogonal to an optical axis of the first imaging device, wherein the target area includes only a portion of a brake assembly of the rail vehicle, and wherein substantially all of imaged portion of the of the brake assembly is illuminated by the pair of illumination devices, wherein the brake assembly is partially obstructed by at least one obstructing component of the rail vehicle located in front of the brake assembly in the image data, the evaluating including:

locating a region of interest within the image data by identifying intersection points in the image data between the at least one obstructing component of the rail vehicle and a rail wheel located adjacent to the brake assembly, wherein the region of interest corresponds to a location where the brake assembly is expected to be partially visible behind the at least one obstructing component;

identifying a set of points in the image data corresponding to at least two edges of the brake assembly, wherein the set of points are found using the intersection points in the image data to define the region of interest, and wherein the identifying includes identifying a separation point between the brake assembly and at least one other adjacent component of the vehicle; and calculating a measurement for at least one attribute of the brake assembly using the set of points.

14. The method of claim 13, wherein the image data includes at least two images having at least partially overlapping fields of view, and wherein the evaluating further includes merging the at least two images to create a single image prior to the locating.

15. The method of claim 13, further comprising:

determining a time for acquiring the image data for a rail wheel based on a set of signals generated by a set of rail wheel detectors; and triggering an imaging device to acquire the image data based on the time.

16. The method of claim 13, further comprising:

comparing the measurement for the at least one attribute of the brake assembly with an acceptable value range for the at least one attribute; and initiating an action in response to the at least one attribute being outside the acceptable value range.

17. The method of claim 16, wherein the action includes at least one of: notifying an operator of the vehicle, rerouting the vehicle, or scheduling the vehicle for maintenance.

18. The system of claim 1, wherein the first and second illumination devices are further rotationally offset from the first imaging device.

19. The system of claim 1, wherein the first and second illumination devices are further translationally offset from the first imaging device.

20. The system of claim 6, wherein the first and second illumination devices are further rotationally and translationally offset from the first imaging device.

* * * * *